Oct. 10, 1950     J. H. PAYNE     2,525,369
SIDE DISK TERRACING MACHINE
Filed May 7, 1946     2 Sheets-Sheet 1

Inventor
Jay H. Payne,
By Clarence A. O'Brien
and Harvey B. Jacobson
Attorneys

Oct. 10, 1950 J. H. PAYNE 2,525,369
SIDE DISK TERRACING MACHINE
Filed May 7, 1946 2 Sheets-Sheet 2

Inventor
Jay H. Payne,

By Clarence A. O'Brien
and Harvey B. Jacobson
Attorneys

Patented Oct. 10, 1950

2,525,369

UNITED STATES PATENT OFFICE 2,525,369

SIDE DISK TERRACING MACHINE

Jay H. Payne, Salina, Kans.

Application May 7, 1946, Serial No. 667,892

1 Claim. (Cl. 97—50)

The present invention relates to new and useful improvements in terracing machines and more particularly to the provision of a disc plow mounted in position in front of the rear left wheel of a tractor for constructing terraces in agricultural land.

An important object of the present invention is to provide a terracing attachment for tractors of this character which may be used separately for constructing a terrace, or which may be used in conjunction with a standard mold board plow or one-way disc for moving the earth in a downhill direction on sloping land, thus constructing the terrace entirely from its upper side.

A further object of the invention is to provide a terracing attachment for tractors which may be easily and quickly mounted in position on a conventional form of farm tractor without necessitating any changes or alterations in the construction thereof and which may be easily and quickly removed from the tractor, when not in use.

A further object of the invention is to provide a device of this character, of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
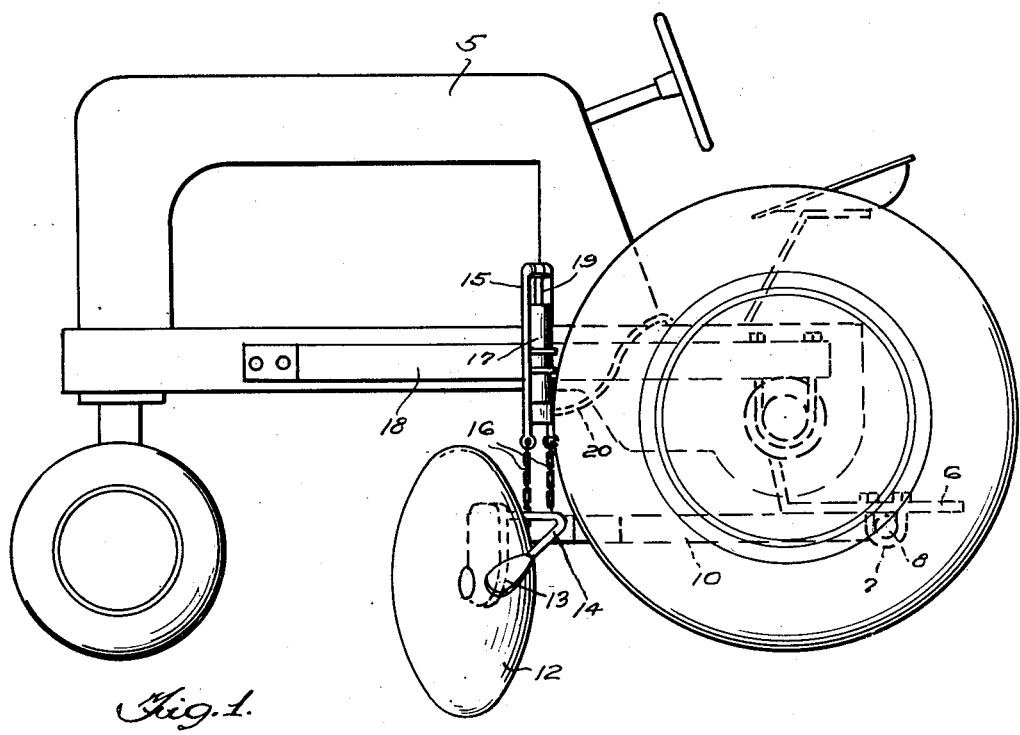
Figure 1 is a side elevational view of a tractor showing the terracing attachment in position thereon.

Referring now to the drawings in detail, wherein for the purpose of illustration I have disclosed a preferred embodiment of the invention, the numeral 5 designates a conventional form of tricycle type farm tractor having a horizontally positioned U-shaped draw bar attached to the rear end thereof in any suitable manner.

A pair of U-bolts 7 are secured to the sides of the draw bar at the underside thereof and in which the ends 8 of a transverse bar 9 are supported for pivotal movement, the ends 8 forming trunnions for the bar 9.

A triangular shaped frame 10 projects forwardly from the bar 9 under the rear end of the tractor and toward the left side thereof and to the front end of the frame is secured an outwardly projecting arm 11 having a disc plow 12 journalled at its outer end for rotation at the end of the arm. The arm 11 supports the disc 12 immediately in front of the left rear wheel of the tractor. The disc 12 is supported in an inclined position for scraping the soil during forward movement of the tractor and moving the same outwardly at the left side thereof. A scraper plate 13 is supported in position against the front surface of the disc 12 by means of a resilient arm 14 also attached to the arm 11.

The disc 12 is supported in vertically adjusted position by means of an inverted U-shaped bracket 15 connected at its lower ends to the front end of the frame 10 by means of chains 16. A hydraulic cylinder 17 is secured in vertical position on a bar 18 secured to the left side of the tractor, the upper end of the cylinder having a piston rod 19 projecting therefrom and engaging the top of the bracket 15. A hose or pressure supply line 20 connects the lower part of the cylinder 17 through a conventional compressor forming part of the tractor 5.

Figure 2:
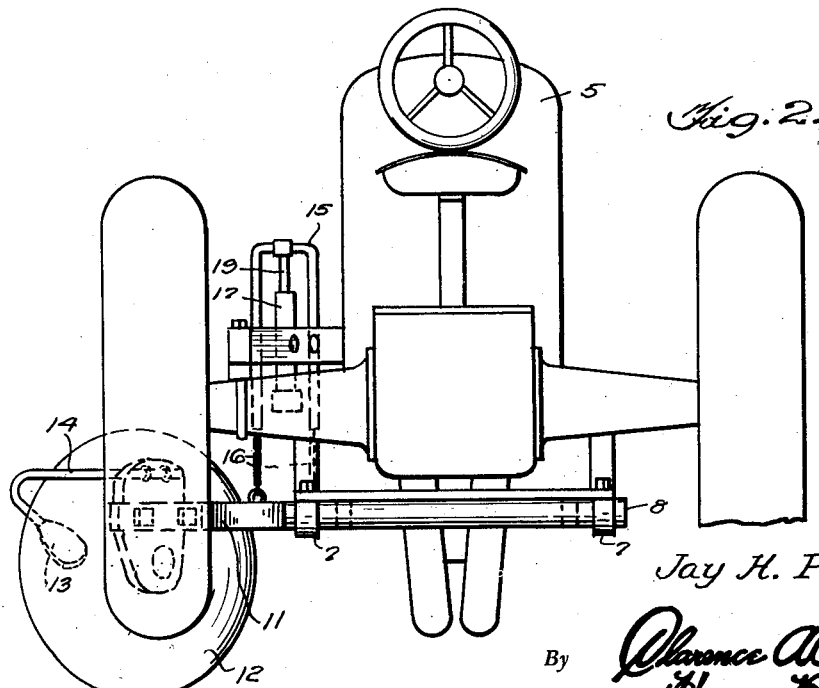
Figure 2 is a rear elevational view.
Figure 3:
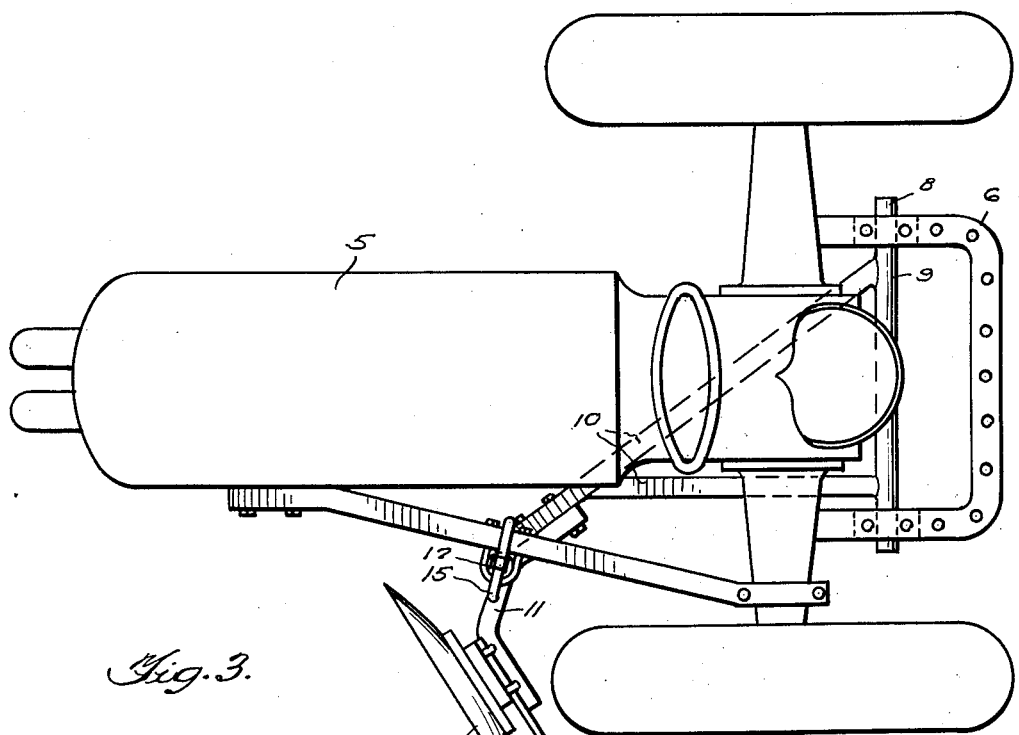
Figure 3 is a top plan view.
Figure 4:
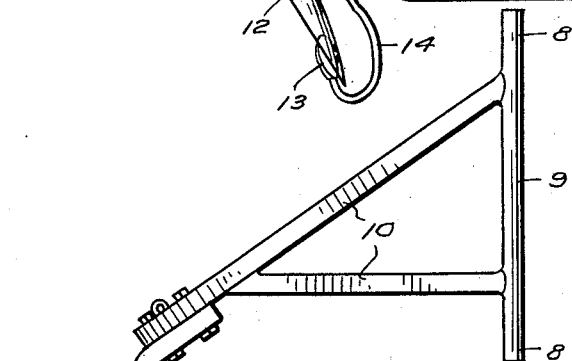
Figure 4 is a plan view of the terracing attachment removed from the tractor.

By attaching the terracing disc 12 to the tractor in the manner as indicated a terrace may be constructed by the plowing and rotating action of the disc in a clockwise direction as seen in Figure 2, the tractor being driven along the slope of the ground to move the earth in a downhill direction to form the terrace.

The terracing disc 12 may also be used in conjunction with a standard mold-board plow or one-way disc attached to the draw bar 6 of the tractor, the disc 12 moving the dirt in a downhill direction and the plow or one-way disc also moving the dirt downhill on the return trip of the tractor, thus utilizing both the terracing disc 12 and the conventional plow or one-way disc to construct the terrace entirely from its upper side.

When the terracing disc 12 is not in use, the hydraulic cylinder 17 is operated to raise the disc out of contact with the soil.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully compre-

I claim as my invention:

A terracing attachment for a tractor of the type having a rear draw bar and rear wheels, said attachment comprising a skeleton frame having a cross shaft at one end thereof, means adapted for rotatably attaching said shaft to said draw bar crosswise of said tractor so that said frame extends beneath the body of the tractor in front of one rear wheel and is vertically swingable, a disk rotatably mounted on the other end of said frame and adapted to rotate in front of said wheel in a plane oblique to the plane of said wheel, a bar adapted to extend horizontally and obliquely from the tractor rearwardly thereof on the same side of the tractor as said wheel, an upstanding hydraulic cylinder fixed to said bar with a vertically movable piston rod extending out of its upper end, and a U-shaped bracket carried by said piston rod in straddling relation to the same and to said cylinder with ends flexibly connected to said frame to lift the frame upon upward movement of said piston rod.

JAY H. PAYNE.

REFERENCES CITED

The following references are of record in the file of this patent:

UNITED STATES PATENTS

| Number | Name | Date |
|---|---|---|
| 1,361,638 | Stephenson | Dec. 7, 1920 |
| 1,442,504 | Wilson | Jan. 16, 1923 |
| 1,456,815 | Morton | May 29, 1923 |
| 1,613,462 | Koger | Jan. 4, 1927 |
| 1,760,336 | Benjamin | May 27, 1930 |
| 2,041,832 | Hester | May 26, 1936 |
| 2,358,298 | Benjamin | Sept. 19, 1944 |